US005216452A

United States Patent [19]

Suzuki

[11] Patent Number: 5,216,452

[45] Date of Patent: * Jun. 1, 1993

[54] INK STORING DEVICE

[75] Inventor: Tetsuo Suzuki, Yokohama, Japan

[73] Assignee: Canon Kabushiki Kaisha, Tokyo, Japan

[ * ] Notice: The portion of the term of this patent subsequent to Aug. 8, 2006 has been disclaimed.

[21] Appl. No.: 340,781

[22] Filed: Apr. 20, 1989

Related U.S. Application Data

[63] Continuation of Ser. No. 52,202, May 19, 1987, Pat. No. 4,855,762, which is a continuation of Ser. No. 485,289, Apr. 15, 1983, abandoned.

[30] Foreign Application Priority Data

May 10, 1982 [JP] Japan ................................ 57-76615

[51] Int. Cl.5 ............................................ G01D 15/18

[52] U.S. Cl. .................................. 346/140 R; 346/75

[58] Field of Search .............. 346/75, 140 R; 400/124

[56] References Cited

U.S. PATENT DOCUMENTS

| | | | |
|---|---|---|---|
| 3,056,384 | 10/1962 | Beale et al. | 118/411 |
| 3,121,138 | 2/1964 | Murphy | 178/5.2 |
| 3,386,102 | 5/1968 | Scheuzger et al. | 346/140 |
| 3,482,258 | 12/1969 | Steen | 101/366 |
| 3,945,022 | 3/1976 | Distler | 346/75 |
| 4,121,222 | 10/1978 | Diebold et al. | 346/75 |
| 4,148,041 | 4/1979 | Rosenstock | 346/140 R |
| 4,183,031 | 1/1980 | Kyser et al. | 346/140 R |
| 4,291,317 | 9/1981 | Corwin et al. | 346/140 R |
| 4,320,406 | 3/1982 | Heinzl | 346/140 R |
| 4,329,698 | 5/1982 | Smith | 346/140 R |
| 4,367,482 | 1/1983 | Heinzl | 346/140 R |
| 4,383,263 | 5/1983 | Ozawa et al. | 346/140 R |
| 4,386,861 | 6/1983 | Kurihara et al. | 400/124 |
| 4,437,104 | 3/1984 | Hudson | 346/140 R |
| 4,447,820 | 5/1984 | Terasawa | 346/140 R |
| 4,695,824 | 9/1987 | Tazaki | 346/140 R |
| 4,855,762 | 8/1989 | Suzuki | 346/140 R |

FOREIGN PATENT DOCUMENTS

| | | |
|---|---|---|
| 2709730 | 9/1978 | Fed. Rep. of Germany . |
| 2812562 | 9/1979 | Fed. Rep. of Germany . |
| 55-142658 | 7/1980 | Japan . |

OTHER PUBLICATIONS

Storage Cabinets, Techni-Tool Inc., Catalog No. 25, p. 170.

*Primary Examiner*—Benjamin R. Fuller
*Assistant Examiner*—Gerald E. Preston
*Attorney, Agent, or Firm*—Fitzpatrick, Cella, Harper & Scinto

[57] ABSTRACT

An ink storing device comprises a first storing portion storing a first type of ink therein and a second storing portion having the interior thereof divided into a plurality of spaces and storing a plurality of types of inks therein. The first type of ink is that type of ink which is used more frequently than the rest of the types of inks, for example, black ink.

6 Claims, 1 Drawing Sheet

INK STORING DEVICE

This application is a continuation of application Ser. No. 07/052,202 filed May 19, 1987, which in turn is a continuation of application Ser. No. 06/485,289, filed Apr. 15, 1983, now abandoned.

BACKGROUND OF THE INVENTION

1. Field of the Invention

This invention relates to an ink storing device for use with an ink jet printer, and more particularly to such ink storing device in which the construction of storing means is improved.

2. Description of the Prior Art

Generally in a multi-color ink jet printer, cyan, magenta, yellow and black inks are used to effect a color output and ink tanks containing the respective inks therein are contained in discrete ink cassette cases which can be freely replaced with new ink cassette cases.

There is also adopted a construction in which the aforementioned four ink tanks are contained in a single ink cassette case.

The adoption of the structure in which the discrete ink cassette cases are provided necessitates providing a plurality of ink cassette cases and accordingly leads to a high cost and poor operability.

Also, the case where a plurality of ink tanks are contained within a single ink cassette case means that an ink tank in which the amount of ink consumption is great and ink tanks in which the amount of ink consumption is small are contained in a single ink cassette case, and in such case, it may happen that the ink cassette case must be replaced with a new one even when inks of other colors still remain in the ink tanks, and this may result in a waste of ink. Further, the fact that a plurality of ink tanks each requiring a predetermined volume are contained within a single ink cassette case leads to the bulkiness of the cassette case itself which means an economical disadvantage.

SUMMARY OF THE INVENTION

It is an object of the present invention to provide an effective ink storing device.

It is another object of the present invention to eliminate the waste of inks.

It is still another object of the present invention to facilitate ink replenishment.

It is yet still another object of the present invention to make the ink storing device compact.

Other objects of the present invention will become apparent from the following detailed description taken in conjunction with the accompanying drawings.

BRIEF DESCRIPTION OF THE DRAWINGS

An embodiment of the present invention is illustrated in the drawings, in which.

DESCRIPTION OF THE PREFERRED EMBODIMENTS

Figure 1:
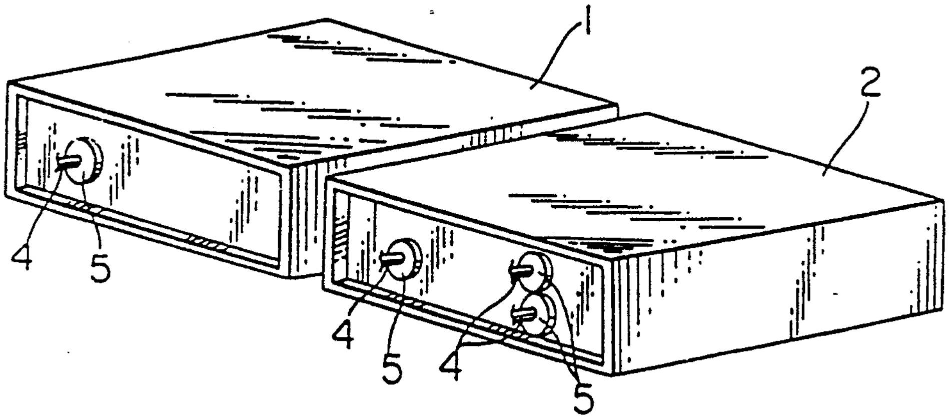
FIG. 1 is a perspective view of ink cassette cases.
Figure 2:
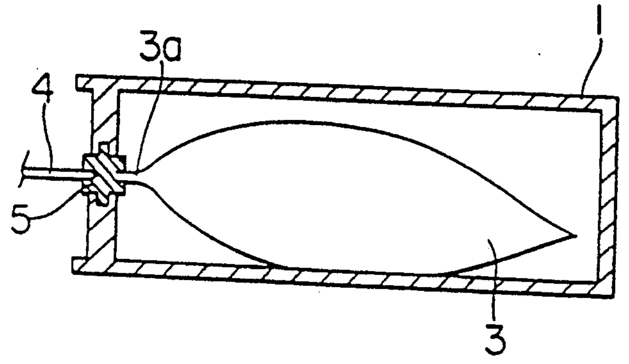
FIG. 2 is a longitudinal cross-sectional view of an ink cassette case which contains therewithin an ink tank in which the amount of ink consumption is great.
Figure 3:
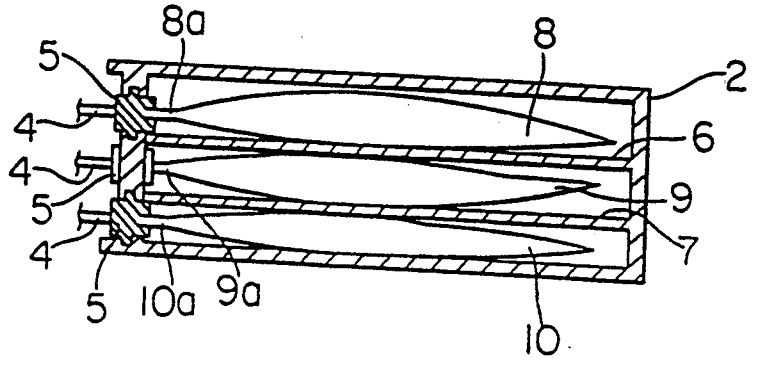
FIG. 3 is a longitudinal cross-sectional view of an ink cassette case which contains therewithin a plurality of ink tanks in which the amount of ink consumption is small.

Referring to FIGS. 1 to 3 which illustrate an embodiment of the present invention, reference numeral 1 designates an ink cassette case containing therein an ink tank in which the amount of ink consumption is great, and reference numeral 2 denotes an ink cassette case containing therein a plurality of ink tanks in which the amount of ink consumption is small. Within the ink cassette case 1, as shown in FIG. 2, there is contained a flexible ink tank 3 in which the amount of ink consumption is great. The ink contained in this ink tank 3 is, for example, black ink whose amount of consumption is great, and the ink tank 3 is contained as a large ink tank within the cassette case 1. A rubber plug 5 which is an outlet portion for letting out the ink is mounted in the supply port 3*a* of the ink tank 3 and is fixed to a side wall of the ink cassette case 1. A needle 4 provided at one end of a tube connected to a nozzle, not shown, in fixed to a printer body (not shown). When the ink cassette case 1 is inserted into the printer body, the needle 4 may be inserted into the rubber plug 5, whereby the supply port 3*a* of the ink tank 3 and the needle 4 may be connected together to permit the ink to be supplied.

On the other hand, the ink tanks containing therein inks whose amount of consumption is small are contained within the ink cassette case 2.

That is, as shown in FIG. 3, horizontal partition plates 6 and 7 are provided within the ink cassette case 2 to divide the interior thereof into three equal spaces.

A flexible ink tank 8 containing, for example, cyan ink therein is contained within the space above the partition plate 6, a flexible ink tank 9 containing magenta ink therein is contained within the space between the partition plates 6 and 7, and a flexible ink tank 10 containing yellow ink therein is contained within the lowermost space.

Rubber plugs 5 are mounted in the supply ports 8*a*–10*a* of the ink tanks 8–10 in the same manner as described previously and are fixed to a side wall of the cassette case 2. These rubber plugs 5 are disposed in spaced apart and staggered relationship with each other so that adjacent plugs are not proximate to each other.

When the cassette case 2 is inserted into the printer body, a needle 4 provided at one end of each of tubes (not shown) connected to nozzles may be inserted into each of the rubber plugs 5 to permit the ink to be supplied.

Of course, the spaces containing the ink tanks 8–10 are formed as such spaces that do not impart pressure to the ink tanks 8–10.

As a second embodiment, the ink cassette cases 1 and 2 may be formed to the entirely identical size as shown in FIG. 1 and the partition plates 6 and 7 may be made removable. Thus, the ink cassette cases used will become entirely identical in size and shape and can be manufactured very economically as compared with a case where ink cassette cases of different sizes and shapes are manufactured. As required, one of these ink cassette cases may be utilized as the ink cassette case 1 containing therein only the ink tank which contains therein the ink whose amount of consumption is greatest and the other ink cassette case may be utilized as the ink cassette case 2 containing therein the ink tanks in which the amount of ink consumption is smaller.

Three rubber plugs 5 may be provided in each of these ink cassette cases, or alternatively a rubber plug may be provided in one of the ink cassette cases and three rubber plugs may be provided in the other ink cassette case.

The present embodiment, as described above, adopts a structure in which the ink cassette is separated into two ink cassette cases, that is, an ink tank of a larger volume containing therein the ink whose amount of consumption is great is contained within one ink cassette case and a plurality of other ink tanks are contained within the other ink cassette case. Therefore, the ink tank in which the amount of ink consumption is great can be made into a large volume and this eliminates the need to replace the cassette case with new one so frequently. Also, as compared with a case where all ink tanks are contained within an ink cassette case, the waste of replacing the ink cassette case with new one in spite of the fact that some of the ink tanks within the ink cassette case still contain inks therein when the ink tank in which the amount of ink consumption is great has become empty is eliminated.

Further, the use of two ink cassette cases, as compared with the structure in which more than two ink cassette cases are used, leads to the possibility of reducing the occupied space and accordingly increasing the compactness of the device.

Furthermore, the use of two ink cassette cases leads to greater ease with which the cassette cases are replaced with new ones.

In the above-described embodiments, as shown in FIG. 3, the ink cassette case containing a plurality of ink tanks therein is vertically divided into three spaces by the partition plates 6 and 7, but alternatively, such ink cassette case may of course be horizontally divided into three spaces.

As will be apparent from the foregoing description, according to the present invention, use is made of two ink cassette cases one of which contains therein an ink tank in which the amount of ink consumption is great and the other contains therein a plurality of ink tanks in which the amount of ink consumption is small, and this leads to the possibility of increasing the volume of the ink cassette case containing therein an ink tank in which the amount of ink consumption is great and which is high in the frequency of replacement, and accordingly the possibility of decreasing the frequency of replacement of such ink cassette case. Also, the use of two ink cassette cases leads to the reduction in the space occupied in the device and accordingly increases the of the device. Moreover, the ink cassette case containing therein the ink tanks in which the amount of ink consumption is small is separate from the ink cassette case containing therein the ink tank in which the amount of ink consumption is great, and this eliminates the waste of ink resulting from replacing the ink cassette case in spite of its still containing inks of other colors therein.

What is claimed is:

1. In a color recording system, the combination of a plurality of ink storing devices for supplying plural types of ink, wherein one of said storing devices has a first housing provided with a first containing section for containing a first ink type only, at least one of the remaining said storing devices has a second housing provided with a plurality of second containing sections for containing plural ink types different from the first ink type, and the volume of each of said plurality of second containing sections is smaller than that of said first containing section, wherein the ink type to be consumed in the greatest amount by said recording system is preselected as the first ink type, and said plurality of ink storing devices are able to be independently attached to and detached from the recording system.

2. In a color recording system, the combination of two storing devices for supplying four types of ink wherein one of aid two devices has a first case member internally provided with a first containing section for containing a black ink type only, the other of said two devices has a second case member internally provided with second, third and fourth containing sections for containing three types of ink different from said back ink type, and the volume of each of said second, third and fourth containing sections is individually smaller than that of said first containing section, wherein said first case member is the same size as said second case member and said first and second devices are able to be independently attached to and detached from said color recording system.

3. In the combination according to claim 2, wherein said second, third and fourth containing sections for storing ink types of yellow, cyan, and magenta, respectively.

4. An ink jet apparatus capable of mounting at least first and second ink containing members for recording with a plurality of kinds of ink, wherein said first and second ink containing members ar comprised of housings, each housing being substantially the same size, said first ink containing member includes a first ink containing section having a large ink capacity for containing a first ink to be used most frequently among the plurality of kinds of ink, said second ink containing member includes a second ink containing section divided into a plurality of spaces, each space for containing independently one of the plurality of kinds of ink different from the first ink, each of said spaces having an ink capacity less than that of said first ink containing section, and said first and second ink containing members are mountable on and removable from said apparatus.

5. An ink jet apparatus according to claim 4, wherein said first ink containing member contains ink of black color.

6. An ink jet apparatus according to claim 4, wherein said second ink containing member contains ink of yellow, cyan and magenta colors to perform color recording.

* * * * *

UNITED STATES PATENT AND TRADEMARK OFFICE

CERTIFICATE OF CORRECTION

PATENT NO. : 5,216,452

DATED : June 1, 1993

INVENTOR(S) : Tetsuo SUZUKI

It is certified that error appears in the above-indentified patent and that said Letters Patent is hereby corrected as shown below:

COLUMN 2:

Line 20, "in" should read --is--.

COLUMN 3:

Line 48, "the of" should read --the compactness of--.

COLUMN 4:

Line 15, "aid" should read --said--;
Line 20, "back" should read --black--;
Line 29, after "sections" insert --are--;
Line 36, "ar" should read --are--.

Signed and Sealed this

Twenty-ninth Day of November, 1994

Attest:

Bruce Lehman

BRUCE LEHMAN

*Attesting Officer* *Commissioner of Patents and Trademarks*